(12) United States Patent
Weinstock et al.

(10) Patent No.: US 8,582,658 B2
(45) Date of Patent: Nov. 12, 2013

(54) METHODS FOR ADAPTIVE VIDEO QUALITY ENHANCEMENT

(75) Inventors: Neil Weinstock, Randolph, NJ (US); Siva Somasundaram, Dayton, NJ (US)

(73) Assignee: Raritan Americas, Inc., Somerset, NJ (US)

( * ) Notice: Subject to any disclaimer, the term of this patent is extended or adjusted under 35 U.S.C. 154(b) by 1265 days.

(21) Appl. No.: 12/106,536

(22) Filed: Apr. 21, 2008

(65) Prior Publication Data

US 2008/0279283 A1 Nov. 13, 2008

Related U.S. Application Data

(60) Provisional application No. 60/917,442, filed on May 11, 2007.

(51) Int. Cl.
*H04N 7/12* (2006.01)

(52) U.S. Cl.
USPC .................................... 375/240.24

(58) Field of Classification Search
USPC .................. 375/240.1, 240.24; 382/248, 261; 345/502
IPC ........................................................ H04N 7/12
See application file for complete search history.

(56) References Cited

U.S. PATENT DOCUMENTS

| | | | |
|---|---|---|---|
| 7,518,614 B2 * | 4/2009 | Emerson et al. | 345/502 |
| 7,995,849 B2 * | 8/2011 | Raveendran et al. | 382/248 |
| 2003/0053708 A1 * | 3/2003 | Kryukov et al. | 382/261 |
| 2004/0028128 A1 | 2/2004 | Sugiyama et al. | |
| 2004/0170330 A1 | 9/2004 | Fogg et al. | |
| 2006/0031917 A1 | 2/2006 | Winder et al. | |
| 2006/0230110 A1 | 10/2006 | VanHarlingen et al. | |
| 2006/0262862 A1 | 11/2006 | Cheng et al. | |
| 2007/0171969 A1 * | 7/2007 | Han et al. | 375/240.1 |

FOREIGN PATENT DOCUMENTS

EP 0771116 5/1997

OTHER PUBLICATIONS

The International Search Report and Written Opinion by the International Searching Authority, issued on Jul. 8, 2008, in the PCT application No. PCT/US08/05497.
The extended European Search Report by the European Patent Office, mailed on Dec. 23, 2010, in the related European Application No. EP 08743397.5.
Ismaell et al., "Removal of DCT blocking artifacts using DC and AC filtering," Communications, Computers and signal Processing, 2003. PACRim. 2003 IEEE Pacific Rim Conference on, vol. 1, pp. 229-232 vol. 1, Aug. 2003.
Tai et al., "Deblocking filter for low bit rate MPEG-4 video," IEEE Trans. Circuits Syst. Video Techn. 15(6): 733-741 (2005).
Shen et al., "Fast compression artifact reduction technique based on nonlinear filtering," ISCAS (4) 1999: 179-182. Park et al., "A postprocessing method for reducing quantization effects in low bit-rate moving picture coding," IEEE Transactions on Circuits and Systems for Video Technology, IEEE Service Center, Piscataway, NJ, US, vol. 9, No. 1, Feb. 1999, pp. 161-171.

* cited by examiner

*Primary Examiner* — David Czekaj
*Assistant Examiner* — Tracy Li (57) ABSTRACT

A method for improving video quality of a video stream. The method decodes the video stream and generates subblocks of video data from the video stream. The method then removes effects of subblock boundaries from previous deblocking. Each subblock is then smoothed to create pixel values and optionally, subblocks are merged if a predetermined quality is not achieved from the smoothing analysis. The pixels values are filled into each pixel position in the subblock. The subblocks are deblocked and then at least one subblock is outputted to a rendering device.

20 Claims, 5 Drawing Sheets

METHODS FOR ADAPTIVE VIDEO QUALITY ENHANCEMENT

CROSS-REFERENCE TO RELATED APPLICATIONS

This application claims the benefit of U.S. Provisional Application Ser. No. 60/917,442, filed May 11, 2007, the disclosure of which is incorporated herein by reference.

FIELD OF THE INVENTION

The invention relates to video data transmitted over a communications network such as for example, a packet switched network.

BACKGROUND OF THE INVENTION

In any video communication solution, a challenge is to simultaneously optimize resource utilization and perceptual quality. In a remote management video access scenario, perceptual quality includes sharp edges of fonts, gradients in application program menus and low latency between video requests and responses. The increase in video resolutions in recent years poses additional bandwidth requirements; if not addressed with appropriate combination of compression and video reconstruction approaches, the quality of video may become unusable in a remote access scenario due to the nature of artifacts introduced. In order to mitigate the effect on the perceptual quality of the video due to these artifacts, the received video needs to be processed fast enough such that the human eye cannot recognize the removal of noise embedded within the video. The need for video processing and rendering at higher resolutions necessitate new noise reduction algorithms that are efficient both in memory size as well as in time.

In remote management systems, video data is transmitted from a remote device or target through a keyboard, video, mouse (KVM) switch to a user that may be located remotely or locally to the KVM switch. In a typical KVM over IP system, source video is sampled from incoming analog VGA signals, and reduced from 24 bits to 16 bits. In particular, the received stream is originally sampled via an A/D device and reduced in bit depth from its original source. As a consequence, down-sampling noise is prominently visible with existing KVM over IP switches.

In particular, perceptual artifacts in the reconstructed video stream originate from a number of channel degradation factors including any or all of the following: (1) reduced color depth or sub-sampled source; (2) channel interference in switched video transmission; or (3) low-contrast transition effects in the video content (a common trend in recent operating systems that imposes additional constraints on bandwidth/quality).

Existing solutions may use video smoothing methods on the source or server side (target) but still result in rendered video with perceptual quality problems and may not satisfy the requirements for real time applications. Further, a KVM over IP implementation that downsamples the incoming video to 16 bits or less has limited ability to exploit a server side solution due to the difficulty of preserving the effects of the video processing using 16 bits. Finally, such systems cannot cost-effectively counteract the noise and other degradations on the source information within the time constraints of a real time video session. The perceptual quality of the noisy received video data needs to be improved.

BRIEF SUMMARY OF THE INVENTION

The innovative approach described herein addresses a fast and adaptive video enhancement algorithm suitable for use in real-time video transmission systems such as those used for high-resolution remote video access. End users in such remote video access include IT administrators, software developers and computer users who access remote servers for day-to-day administrative functions. The typical modes of access in such operations use both graphical means as in modern GUI-based operating systems, or text consoles as in the case of remote shells. In each case, preservation of high-frequency edge detail of visual features such as text, menus, or other GUI elements is critical. Also critical is the real-time response of the system, requiring high frame rates and low latencies to ensure satisfactory user experience. An optimal method is presented to improve the perceptual quality of the reconstructed video by removing visual artifacts generated from the video sampling, downsampling, and switching processes present in typical KVM-over-IP systems. This method exploits a careful characterization of the artifacts generated in such systems, and is thus able to smooth areas of continuous color where artifacts are most visible, while preserving both important edge detail and the real-time behavior of the system.

A method is presented for improving video quality of a video stream. The method decodes the video stream and generates subblocks of video data from the video stream. The method then removes effects of subblock boundaries from previous deblocking. Each subblock is then smoothed to create pixel values and optionally, subblocks are merged if a predetermined quality is not achieved from the smoothing analysis. The pixels values are filled into each pixel position in the subblock. The subblocks are deblocked and then at least one subblock is outputted to a rendering device.

The innovative adaptive video quality enhancement method of the present application is preferably done at the client side, which co-exists with the 24-bit display, and as a result, 24-bit video output derived from the 16-bit video input can be generated with minimal visual artifacts Application of the innovative client side method perceptually reduces or eliminates the visible noise that results from sampling and bit depth reduction on the server side, and therefore improves the appearance of received video over an IP stream. From a perceptual quality basis, the innovative method partially reproduces the appearance of 24-bit video even though it is reconstructed from a 16-bit video stream.

DETAILED DESCRIPTION OF THE INVENTION

I. Exemplary Architecture

Figure 1:
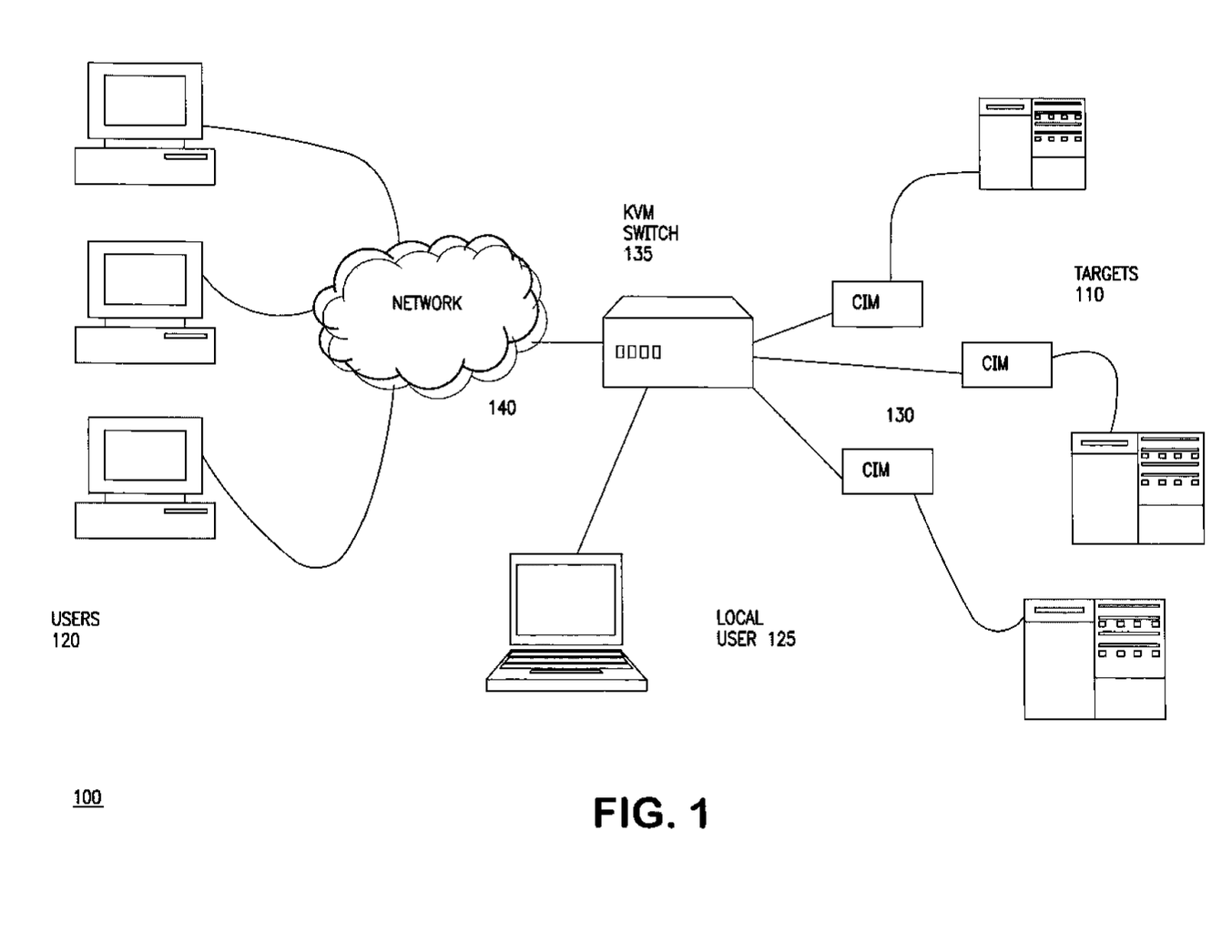
FIG. 1 is an exemplary system using an exemplary switch in accordance with the invention.

Referring to FIG. 1, there is shown an exemplary remote management and access system 100 in which the innovative method can be implemented to improve the rendered video at the user or client side of a network 140. Although the example discussed below is described with respect to a remote management session in system 100, the method is applicable to any video networked system.

System 100 comprises a plurality of remote devices or targets 110 that can be accessed by remote users 120 and local users 125 through switch 135. Remote devices 110 can be any of a number of devices including servers, computers and other construct. Remote devices 110 are connected to switch 135 via computer interface modules 130, which act to condition keyboard, video and mouse signals for the remote connection. Remote users 120 are connected through a network 140 to switch 135 and local user 125 is connected to switch 135. The connections can be made using any of a number of standard techniques including but not limited to wired, wireless, Ethernet, cable, and others.

II. Exemplary Implementation

Figure 2:
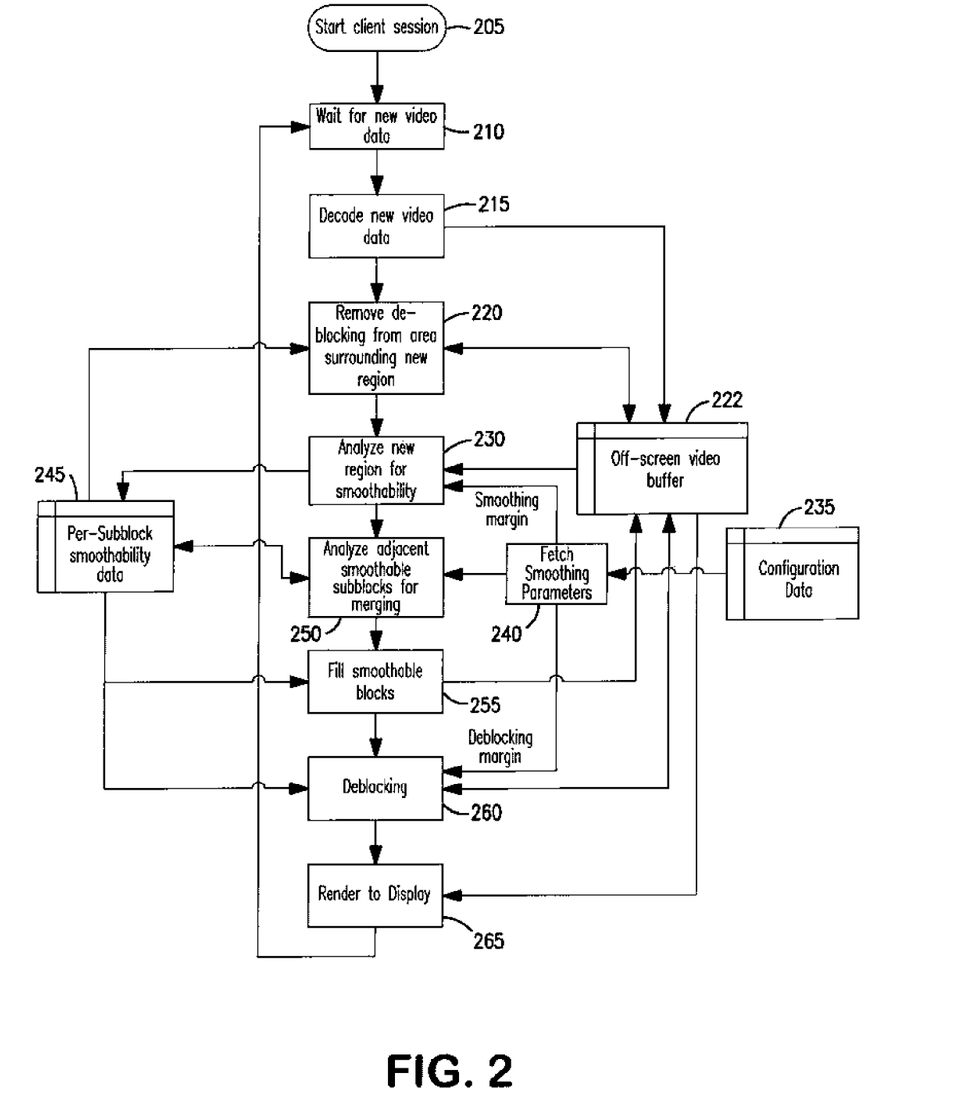
FIG. 2 is an exemplary top level flowchart in accordance with the invention.

Referring now also to FIG. 2, there is shown an exemplary top level flowchart 200 of the innovative method that illustrates adaptive video quality enhancement method on the client side or user side of the video stream in accordance with the invention.

Receiving and Decoding

In a remote management system 100, a user 120 or 125 initiates a remote management session between user 120 or 125 and target 110 in step 205. Encoded video data from the target/server 110 is received in step 210 and decoded into an off-screen video buffer 222 in step 215. Steps 210 and 215 set the stage for the remaining blocks of the innovative method. Video buffer 222 serves as a work area to assemble and process the data prior to rendering it to a screen and contains 24-bit RGB pixel data. The video data may have been encoded using any of a variety of standard or proprietary schemes. If the video data encoded fewer than 24 bits per pixel, then a transformation must be applied to create the 24-bit output to the video buffer 222. The working details of this process of up-converting the source sample bit depth to the required bit depth are considered to be a feature of the particular encoding/decoding scheme employed. Note that video updates received by user/client 120 may only cover a subset of the screen at any instant. A region that receives updates from frame to frame is referred to as the "update region" in this exemplary discussion. The present invention method leverages such progressive video updates for scenarios like interactive video sessions e.g., KVM. Note that the state of the video buffer 222 is continuous in time and hence may have residue of the previously processed data based on the earlier decoding and smoothing operations.

Subblocks

Figure 3:
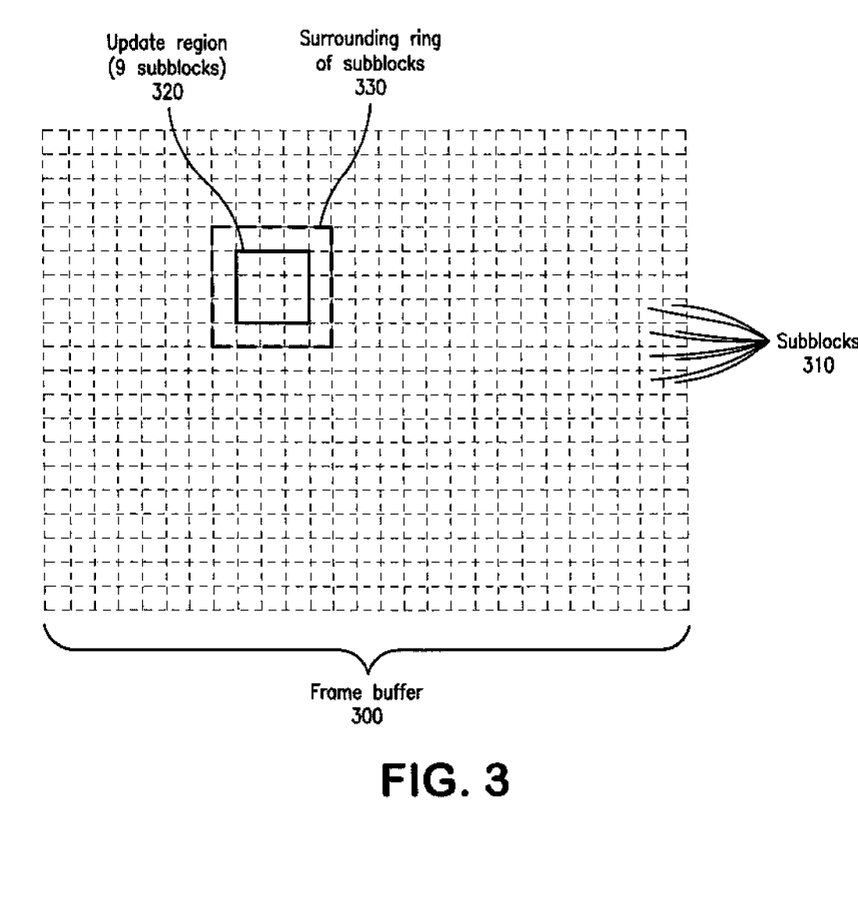
FIG. 3 shows an exemplary frame buffer divided into subblocks and illustrating an update region.

For the remainder of the method, the video data is divided into square subblocks of a given size. The size of the subblock is dependent on the needs of the application, where smaller size subblocks may produce superior video output at the expense of increased processing time. Subblock size may either be determined by the user/client 120 or sent by the target/server 110 to the user/client 120 over a control channel independent of the video stream. A typical application might use a subblock size of 4×4 pixels, but larger or smaller subblocks are possible. FIG. 3 shows an exemplary representation of the content of a frame buffer 300 that is divided into subblocks 310. The frame buffer 300 illustratively depicts an update region 320 comprised of nine subblocks, as well as a surrounding ring 330 of subblocks that border the update region 320.

Remove Blocking

Figure 4:
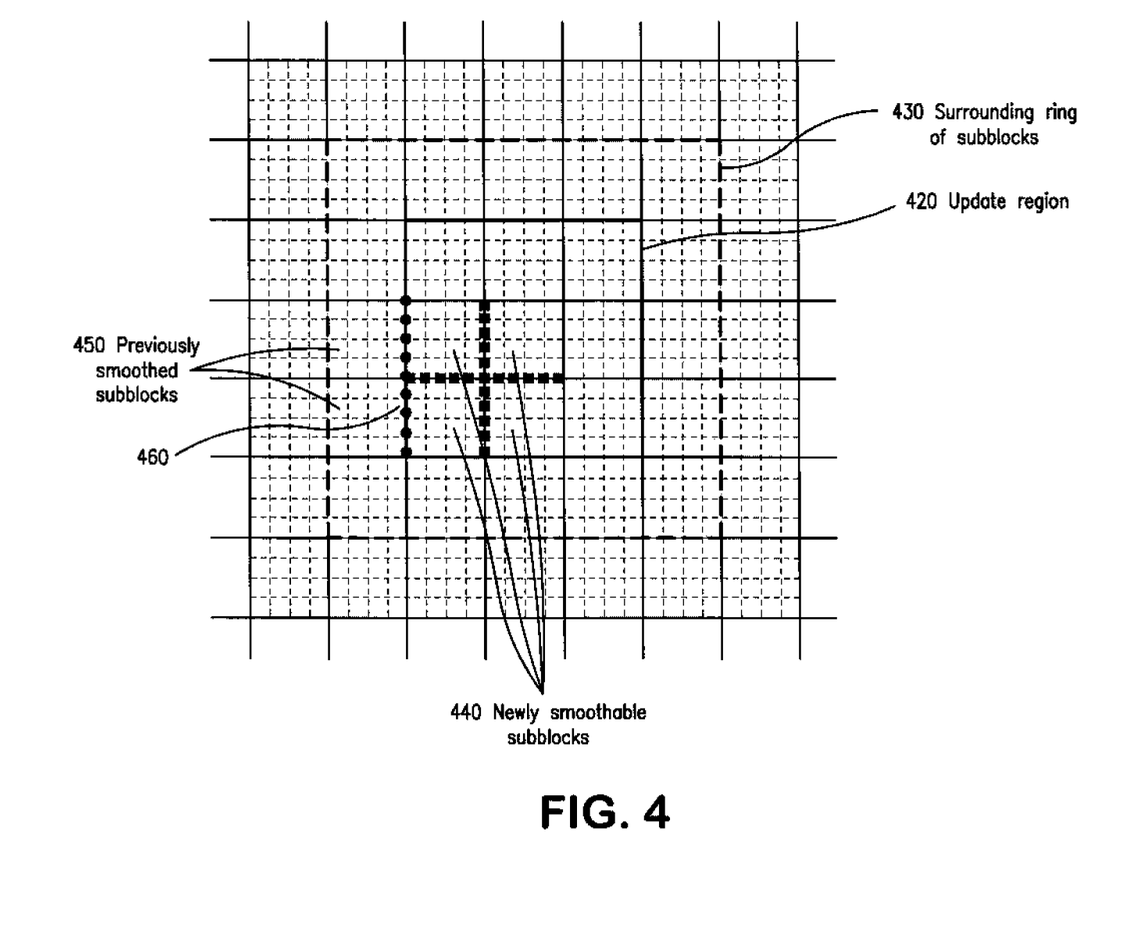
FIG. 4 shows another exemplary representation of an update region of a frame buffer.

As described below, the penultimate step 260 in the method of the present invention is the removal of subblock boundaries, called deblocking. In order to provide a pristine frame buffer in which to apply this method, we must start by removing the effects of the previous deblocking operations on the edges of the current update region. FIG. 4 shows a magnified region of frame buffer 400 that includes update region 420 and surrounding ring 430, where the update region includes a number of newly smoothable subblocks 440. For each subblock in the surrounding ring 430, if the subblock was previously smoothed, for example, at region 450, then we ensure that the edge 460 adjoining the update region 420 is free of deblocking. For a typical deblocking scheme, this is a simple matter of setting the color of the edge pixels to the color of the center of the subblock. Later on, deblocking may be reapplied to these edges if necessary.

Smoothing Analysis

Referring to FIG. 4, in connection with FIG. 2, in step 230, the decoded video in the update region 420 is analyzed for smoothability. The pixel data of each subblock is analyzed to determine if this subblock is smoothable. The criteria used to make this determination are formulated to accommodate perceptual quality and avoid unwarranted removal of important information and are inputted and stored in blocks 235 and 240. The criteria in the form of parameters are then used as inputs to steps 230, 250 and 255 as detailed below. In particular, one simple but effective approach for smoothability is to define a smoothing margin parameter. The subblock is declared to be smoothable if, for all pixels in the subblock, each color channel (red, green, or blue) stays within a range defined by smoothing margin. In other words, for each color channel, the difference between the largest and smallest value in the subblock is less than or equal to the smoothing margin. The results of this analysis are stored for later reference in block 245. In addition to the Boolean value of whether the subblock is smoothable, the mean red, green, and blue values of the current subblock are also stored in block 245, and this is denoted as the average pixel value. This computation calculates a single average color value for the subblock, given the determination (smoothability analysis) that this subblock was nearly uniform in color on the original video source.

Merging Analysis

Averaging video data over the area of a subblock may be insufficient depending on the specific noise patterns overlaid on the video. To combat this, in step 250 the ability to "merge" adjacent subblocks extending throughout the full size of the frame is analyzed. This analysis uses the metadata generated in step 230 (smoothing analysis) and stored in block 245.

For each subblock, the average pixel value (computed in step 230) is compared to that of each adjacent, smoothable subblock, to determine if the values are "close" and potentially mergeable. Closeness may be defined in a number of ways. In an exemplary implementation, closeness is defined in terms of a merging margin parameter, which defines a maximum allowable difference between each corresponding color value of two average pixel values for the purposes of merging.

To complete this operation, a weighted average of the average pixel value is computed (similar to Gaussian kernel) of the subblock being analyzed and all of its neighbors which are determined to be "close". The weights assigned to the different blocks may be tuned according to the application. In an exemplary embodiment, the weight assigned to a center subblock of a frame buffer will be the highest. The weighted average computed in this step 250 is called the new pixel value for the subblock and is stored in block 245.

Note that for the outer edges of the update region, subblocks outside the update region are being considered for this analysis. We may optionally also re-process the surrounding ring of subblocks so that they can be properly merged (if applicable) with the new data in the update region.

The Merging step accounts for the fact that noise patterns may extend beyond a single subblock. Smoothing each subblock in isolation in many cases leaves considerable subblock-subblock color variation, even in areas which were uniform in the source video. By averaging within a neighborhood when we determine that the neighboring subblocks are close in color, we can largely eliminate this variation, and produce extremely smooth color reproduction over large areas of the video screen, even in the presence of considerable noise from the source.

Fill The Subblocks

Once the new pixel values have been computed in step 250, we next fill that value from block 245 into all pixels of the subblock in step 255.

Deblocking

Figure 5:
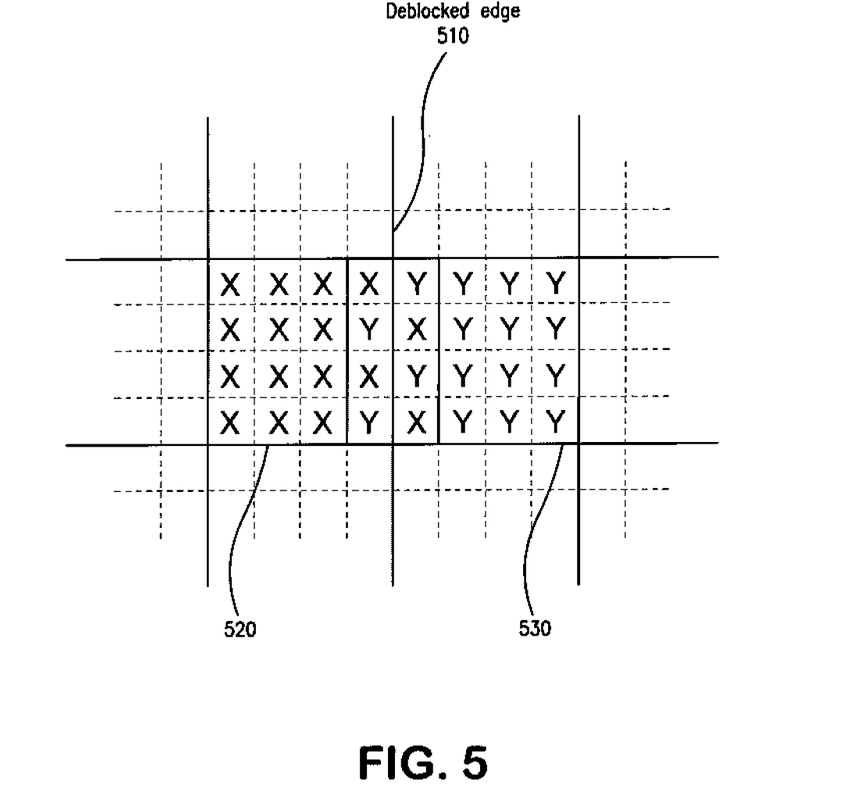
FIG. 5 shows an exemplary representation of a two adjacent subblocks having a deblocked edge.

For all subblocks in the update region 420, at step 260, we now apply the deblocking operation to smooth the boundaries between adjacent smoothed blocks. We may choose to perform this only if the adjacent subblocks meet a defined condition as configured by the deblocking margin as inputted from block 240. The deblocking margin defines the maximum allowed difference between the new pixel values of adjacent subblocks to be eligible for deblocking. There are many approaches to deblocking used in video decoders today. For this application, a fast and effective approach is adopted that dithers together the rows of pixels on either side of a shared edge 510, as is illustrated in FIG. 5. In this figure, "X" and "Y" represent the new pixel values for these two subblocks 520, 530 sharing edge 510.

Without deblocking, the pattern of square subblocks would be readily visible in areas of smooth color gradients, common in both natural images and modern operating system user interfaces. By dithering the edges of eligible adjacent blocks, the square subblock boundaries are effectively concealed, the the resulting color gradients appear smooth. The deblocking margin assures that adjacent subblocks that are different enough to not be part of a single gradient retain their sharp boundaries as needed.

Rendering

In step 265, after completing the smoothing of the video data in the update region 420, the modified portion of the off-screen video buffer 220 is rendered to the screen or display of the user 120 or 125. In certain conditions, the modified portion may include the ring of subblocks 430 surrounding the update region, since those subblocks may have had new merging and/or deblocking operations applied.

To facilitate the various steps in this method, it is necessary to retain certain metadata along with the pixel contents of the frame buffer between frames updated. This metadata is useful in processing the subblocks in the surrounding ring, because we no longer have access to the original pixel data. Specifically, for each subblock, we shall retain:

whether that subblock was smoothed the last time it was rendered (used in merging and deblocking); and
the average pixel value for the subblock (used in merging), where this is only applicable if this is a smoothed subblock.

In general, a method for improving video quality of a video stream is discussed. The method decodes the video stream and generates subblocks of video data from the video stream. The method then removes effects of subblock boundaries from previous deblocking. Each subblock is then smoothed to create pixel values and optionally, subblocks are merged if a predetermined quality is not achieved from the smoothing analysis. The pixels values are filled into each pixel position in the subblock. The subblocks are deblocked and then at least one subblock is outputted to a rendering device.

While the method described focuses on operations in RGB space, it may readily be extended to alternate color spaces or even the frequency domain if needed to enhance the perceptually important pixel information. In this case, the various margin parameters must be tuned for the color space being used, and the time and memory requirements of the color transformations must be accounted for to preserve the real-time performance of the system.

In addition to perceptually smooth region reconstruction, this method also addresses the need, for improving video quality of video streams at a speed suitable for remote management of machines. This method operates in real time on standard client hardware by (a) leveraging the rapidly increasing performance of typical PC-based client systems, (b) restricting to simple integer-based operations, and (c) limiting the range of input pixels which need to be processed to compute the new value of each output pixel.

A computer-readable medium for use in a device capable of processing video streams is also presented. The computer-readable medium having computer-executable instructions for performing acts as discussed above. Specifically, decoding the video stream; generating subblocks of video data from the video stream; removing effects of subblock boundaries from previous deblocking; smoothing each subblock to create pixel values; merging subblocks if predetermined quality is not achieved from smoothing analysis; filling in the pixels values into each pixel position in the subblock; deblocking the subblock; and outputting at least one subblock.

It is understood that FIG. 2 is illustrative only and that other program entry and exit points, time out functions, error checking routines and the like (not shown) would normally be implemented in typical system software. It is also understood that the system software can be implemented to run continuously. Accordingly start blocks and end blocks are intended to indicate logical beginning and ending points of a portion of code that can be integrated into a main program and called as needed to support continuous system operation. Implementation of these aspects of the invention is readily apparent and well within the grasp of those skilled in the art based on the disclosure herein.

Although an exemplary network environment is described above, any network or interconnection of computers, servers, appliances and other devices are applicable and can be used with respect to the method described above. The teachings of the present invention are applicable to any network for transmitting video including for example the Internet. Computers commonly operate in a networked environment using logical connections to one or more computers. The computers used in conjunction with the method may be a personal computer, a server, a router, a network PC, a peer device or other common network node, and typically includes many or all of the elements described above. The connections include but are not limited to local area network (LAN), wide area network (WAN) and other such networking environments that are commonplace in offices, enterprise-wide computer networks, intranets, and the Internet. It will be appreciated that the network connections shown are exemplary and other means of establishing a communications link between the computers may be used. For purposes of illustration, programs and other executable program components such as the operating system are illustrated herein as discrete blocks, although it is recognized that such programs and components reside at various times in different storage components of the computer, and are executed by the data processor(s) of the computer. Different combinations of hardware and software can be used to carry out the teachings of the present invention. A computer or computing device typically includes a processor. A processor typically includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including a processor. Memory preferably stores a computer program, e.g., code or sequence of instructions being operable by a processor.

In a streamed video setup, the source video is compressed and encoded offline prior to transmission. Hence, the compression and error recovery parameters need not be stringent compared to real time delivery needs. A streaming application permits the choice of finding additional headers/markers within the data stream iteratively as required for error correction and/or error concealment purposes. This possibility of finding the optimal parameters local to the video data do not exist if the video has to be delivered in near real time, as in the case of remote video access where the latency of video received for any given mouse click is critical. Noise reduction approaches thus have to be sensitive to both time and region or blocks within the video frame. High frame rates dictate that the reconstruction algorithm at the receiving end must be completed at short time intervals; otherwise, the time-consuming decoding process at the receiver end limits the achievable throughput. Importantly the quality enhancement method has been devised to provide near real time video delivery at higher resolutions on all simultaneous sessions viewed by multiple users at different ends. The video approaches that exist in the literature and practice typically focus on natural video scenes, which do not translate well for remote video access applications, neither as a stand-alone solution nor within a switched environment. The existing approaches also do not address real time delivery of high-resolution video under noisy channel conditions.

The system described here works optimally and the subjective comparison of our approach confirms the quality enhancement within the remote access application context. The implementation results are demonstrated to a mixed set of viewers ranging from sales and engineering at all levels and their responses convey that our approach shows superior quality and performance compared to existing technologies. The major factor for such improved quality is derived from optimizing the overall method based on the observed channel characteristics.

The methodology is flexible and can be applied at both (or either) client and server sides of any video networking system, though for reasons described above it is optimally applied at the client side. The parameters proposed in this method can be optimized to match the nature of the artifacts generated on the server side. The method can also be selectively applied on arbitrary sub-regions of the image based on a selected "region of interest". For example, the method can be customized to preserve higher frequency content as preferred in KVM and document transmissions. This method can be extended in the temporal direction to eliminate jitter and other clock related degradations in the video source While the foregoing description and drawings represent the preferred embodiments of the present invention, it will be understood that various changes and modifications may be made without departing from the spirit and scope of the present invention.

What is claimed is:

1. A method for improving video quality of a video stream comprising video data for an update region defining only a portion of a display screen to be rendered, comprising the steps of:
    decoding the video stream;
    generating subblocks of video data from the video stream for the update region;
    identifying subblocks of video data previously stored in a video buffer that border the subblocks of video data from the video stream;
    retrieving metadata of the bordering subblocks from a metadata store to determine whether one or more of the bordering subblocks was previously deblocked;
    removing effects of the previous deblocking from the one or more bordering subblocks that were previously deblocked;
    analyzing pixel data of the subblocks for the update region to determine whether one or more of the subblocks are smoothable;
    smoothing each smoothable subblock to create updated pixel values for pixels in the subblock;
    storing the updated pixel values for each smoothable subblock in a smoothable data store;
    determining whether adjacent ones of the smoothable subblocks and the bordering subblocks are deblockable;
    applying deblocking to update pixel values in the smoothable data store for pixels in border regions of the adjacent ones of the smoothable subblocks and the bordering subblocks;
    retrieving the updated pixel values from the smoothable data store;
    updating pixel values in the video buffer according to the values retrieved from the smoothability data store; and
    outputting updated pixel values from the video buffer for at least one subblock in the update region.

2. The method according to claim 1, wherein the step of determining whether one or more of the subblocks for the update region are smoothable includes the step of determining if pixel values for all pixels within the subblock fall within a predetermined range.

3. The method according to claim 2, further comprising the step of determining if for all pixels in the subblock, each color channel stays within a smoothing margin.

4. The method according to claim 3, further comprising the step of determining for each color channel, whether a difference between a largest pixel value and a smallest pixel value is less than or equal to the smoothing margin.

5. The method according to claim 1, wherein the step of determining whether one or more of the subblocks for the update region are smoothable includes the step of determining an average pixel value for each color channel.

6. The method according to claim 1, wherein the step of deblocking is applied to update pixel values near boundaries between adjacent smoothable subblocks if predetermined conditions are met.

7. The method according to claim 1, wherein the step of deblocking updates the pixel values to dither a shared edge between adjacent subblocks.

8. The method of claim 1, wherein the video stream is produced in connection with a remote management system for remote management of computer devices over a network.

9. The method of claim 8, wherein said remote management system is a KVM remote management system.

10. The method of claim 9, wherein source video in said KVM remote management system is sampled from incoming VGA signals and reduced from 24 to 16 bits.

11. The method of claim 10, wherein a 24-bit video stream is reconstructed at a client-side video output device using a 16-bit video stream transmitted over said network.

12. A non-transitory computer-readable medium for use in a device capable of processing video streams comprising video data for update regions defining only portions of a display screen to be rendered, the computer-readable medium having computer-executable instructions for performing acts comprising:
  decoding the video stream;
  generating subblocks of video data from the video stream for the update region;
  identifying subblocks of video data previously stored in a video buffer that border the subblocks of video data from the video stream;
  retrieving metadata of the bordering subblocks from a metadata store to determine whether one or more of the bordering subblocks was previously deblocked;
  removing effects of the previous deblocking from the one or more bordering subblocks that were previously deblocked;
  analyzing pixel data of the subblocks for the update region to determine whether one or more of the subblocks are smoothable;
  smoothing each smoothable subblock to create updated pixel values for pixels in the subblock;
  storing the updated pixel values for each smoothable subblock in a smoothable data store;
  determining whether adjacent ones of the smoothable subblocks and the bordering subblocks are deblockable;
  applying deblocking to update pixel values in the smoothable data store for pixels in border regions of the adjacent ones of the smoothable subblocks and the bordering subblocks;
  retrieving the updated pixel values from the smoothable data store;
  updating pixel values in the video buffer according to the values retrieved from the smoothability data store; and
  outputting updated pixel values from the video buffer for at least one subblock in the update region.

13. The non-transitory computer-readable medium of claim 12, wherein the video stream is produced in connection with a remote management system for remote management of computer devices over a network.

14. The non-transitory computer-readable medium of claim 13, wherein said remote management system is a KVM remote management system.

15. The method according to claim 2, prior to the step of determining whether the adjacent ones of the smoothable subblocks and the bordering subblocks are deblockable, further comprising the steps of:
  determining whether adjacent ones of the one or more smoothable subblocks are mergeable;
  merging the mergeable subblocks to create updated pixel values for the pixels in the mergeable subblocks; and
  storing the updated pixel values for each mergeable subblock in the smoothability data store.

16. The non-transitory computer-readable medium according to claim 12, wherein the computer-readable medium further includes computer-executable instructions for performing acts prior to the acts of determining whether, the adjacent ones of the smoothable subblocks and the bordering subblocks are deblockable that comprise:
  determining whether adjacent ones of the one or more smoothable subblocks are mergeable;
  merging the mergeable subblocks to create updated pixel values for the pixels in the mergeable subblocks; and
  storing the updated pixel values for each mergeable subblock in the smoothability data store.

17. The method according to claim 15, wherein the step of merging includes the step of comparing average pixel values of the adjacent mergeable subblocks to determine if a difference falls within a predetermined range.

18. The method according to claim 15, wherein the step of merging includes the step of calculating the difference for each color channel.

19. The method according to claim 15, wherein the step of merging includes the step of computing a weighted average of the average pixel values for the subblocks that are merged.

20. The method according to claim 15, wherein the step of merging computes a weighted average of the average pixel values for the subblocks that are merged.

* * * * *